June 24, 1947.  W. R. MacCLUNEY  2,422,916
PELICAN HOOK
Filed Sept. 7, 1944
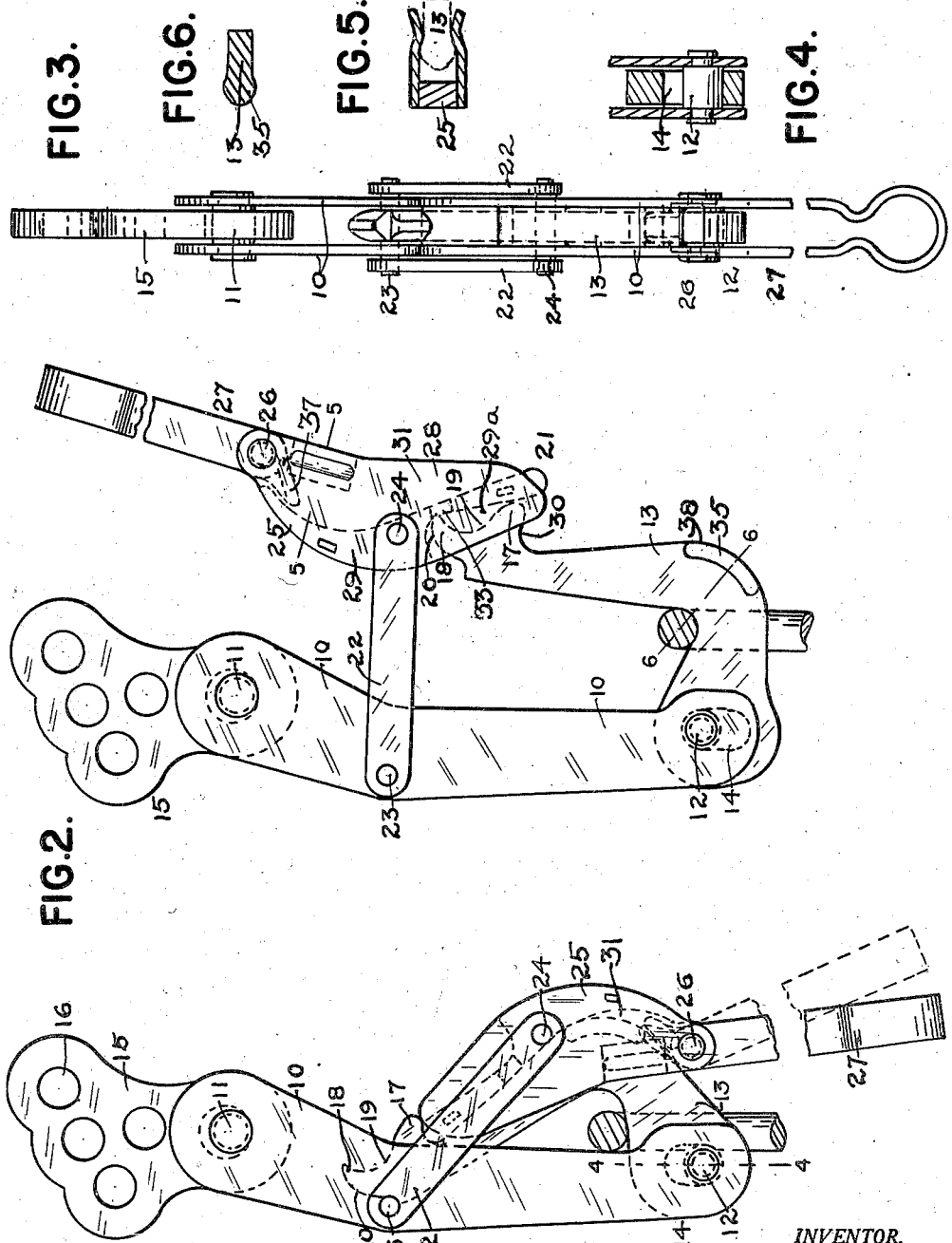
INVENTOR.
WILLIAM ROBERT MacCLUNEY
BY
ATTORNEYS Patented June 24, 1947

2,422,916

UNITED STATES PATENT OFFICE 2,422,916

PELICAN HOOK

William Robert MacCluney, Dearborn, Mich.

Application September 7, 1944, Serial No. 552,956

7 Claims. (Cl. 294—83)

This invention relates to a pelican hook and is an improvement upon my prior inventions bearing Serial No. 511,728, filed November 24, 1943, and Serial No. 522,559, filed February 16, 1944.

It is an object of this invention to provide a pelican hook which will afford the maximum strength consistent with its weight, and which when in the closed position will give increased freedom from danger of being opened accidentally by a sudden strain or jar.

It is a further object to provide a hook of the character described, which will afford an increased tightening of tension upon the cable or chain to which it is attached during the closing operation, but which nevertheless may be readily opened.

It is a further object to provide a device of the character described, in which the strain between the cables is carried as nearly as practicable in alignment between the point of attachment of the hook to the upper strain member and the pivot of the pivoted member of the hook.

It is a further object to produce a hook in which the closing leverage is very materially increased as the hook approaches the closed position during the closing movement, so that a considerable take-up can be obtained during the closing, but nevertheless the leverage when in closed position will be quite high.

It is a further object to provide a pelican hook in which the parts are so constructed as to prevent any part of the hook from falling, in any position of the handle except by deliberately raising the handle to release it. Thus the arrangement of the hook upon its chain or cable preparatory to closing is facilitated.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Fig. 1 is a side elevation of a hook embodying this invention in the closed position.

Fig. 2 is a similar view with the parts of the hook in initial contact preparatory to the closing movement.

Fig. 3 is an edge elevation thereof.

Fig. 4 is a section on the line 4—4 of Fig. 1.

Fig. 5 is a section on line 5—5 of the Fig. 2; and

Fig. 6 is a section through the link on the line 6—6 of Fig. 2.

In the drawings, the numeral 10 represents a pair of side members joined together in spaced relation at their upper and lower ends by rivets 11 and 12, and thereby forming with the rivets the main link of the hook.

The movable arm of the hook is designated by the numeral 13. It fits between the side members 10 and is pivoted upon the rivet 12. Preferably and for a purpose hereinafter disclosed, the movable arm is provided with a slot 14 at the point where it engages the rivet 12, so as to provide a certain free motion between the parts in a vertical direction when the hook is closed.

An attaching member 15 fits also between the members 10 and is pivoted about the rivet 11. This member is provided with holes 16, through which a cable or chain may be attached to the device.

The movable hook member 13 is generally L-shaped in cross section and is provided at its upper end with a pair of points 17 and 18, separated by a pocket 19, for a purpose to be described. The upper of these points 18 has an upper engaging face 20 and the lower point 17 constitutes a hook member for cooperation with a member 21 which will be described.

A link member 22 is pivoted to the main links 10 at 23 and is pivoted at 24 to a closing lever 25, to which is pivoted at 26 a handle 27. This closing lever may be conveniently constructed in the form of two side plates 28 joined together by a web 29 which serves to space the plates 28. These plates 28 extend beyond the web 29 on each to form a pocket. One of these pockets, as at 29a, is in position to embrace the end of the arm 13. The web side of this pocket has an upper surface adapted to rest upon the end of the arm 13 and a flat face adapted to bear against the outer face of the arm 13, so that with the parts in position shown in Fig. 2, the arm 13 will not fall outwardly and downwardly to disengage itself from the closing lever. The flat face of the web extends downwardly to form a point 21 adapted to enter into the pocket 30 in the arm 13 beneath the point 17 to complete the final closing of the hook. The side plates of the closing lever hold the parts against lateral displacement.

The other of the pockets referred to, that is 31, is adapted to embrace the elbow of the arm 13 when the closing lever is in its lowest position. A hole 33 is provided in the web 29 just below the pivot 24 to receive the point 18. This is for the purpose of holding the arm 13 in assembled relation to the closing lever before the latter is rotated to move the hook into closed hook position.

It will also be noted that this hole is so situated with regard to the point 21 and with regard to the upper surface of the pocket 29a that, as the closing lever is rotated toward closed position from the position shown in Fig. 2, the surface 20 will ride on the upper surface of the pocket while point 21 forces the arm 13 inwardly by engaging the point 17. This prevents the connecting link and the closing link from falling down about the pivot 23, until the closing operation has gone far enough to prevent it.

As this motion continues, the point 21 will enter into the pocket 30 before the surface 20 passes out from under the upper face of the pocket, and thus the point 21 fits within the recess 30 and continues to do so until the link 13 is forced to the closed hook position shown in Fig. 1.

The closing lever is so designed that as it is rotated about the pivot 24 from the position shown in Fig. 2, the projection 21 first bears against the point 17, partly closing the lever, and thereafter the point 21 enters into the pocket 30 and completes the closing movement. In the final stages of the closing, the point 21 may, if desired, be made to bear upwardly against the face of the pocket to lift the arm 13, thereby putting an additional tension upon the chain. The word "chain" is used herein generically as representing whatever chain, cable, rope, or hook is employed.

It will be noted that during the closing movement, the link 22 passes over the point of engagement between the point 21 and the pocket 30, so that once the hook is in closed position, it is locked against accidental opening.

The link 13 is provided with a friction pad or projection 35 in a position to enter between the plates 28 of the closing lever until it engages or passes beyond friction members 34 upon the inner face of the plates 28, so that when the closing lever has reached the closed-hook position, it is locked against accidental displacement by these friction members.

The handle 27 is provided with a projection 37 adapted, in the position of the handle shown in Fig. 2, to engage the web 29 to permit the handle to move the closing lever to closed press position, and in the position shown in Fig. 1 to bear against the outer face 38 of the arm 13, so that an outward movement of the handle 27 from the position shown in Fig. 1 will have a leverage to force the pad 33 away from the disc 34 and break the locking effect of the lever.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pelican hook comprising a main link having at one end a chain receiving portion, a pivoted arm pivoted to the other end of said link, said arm having a chain receiving portion, a closing lever, a connecting link pivoted at one end to said main link and at the other end to said closing lever, said closing lever having a handle and an engaging arm for engaging the free end of said movable arm, said movable arm having a recess near its end into which said engaging arm moves as the closing lever is turned about its pivot, said parts being so proportioned that the closing of the closing link will move the movable arm bodily upwardly against the direction of strain between the chain receiving portions.

2. A pelican hook comprising a main link having at one end a chain receiving portion, a pivoted arm pivoted to the other end of said link, said arm having a chain receiving portion, a closing lever, a connecting link pivoted at one end to said main link and at the other end to said closing lever, said closing lever having a handle and an engaging arm for engaging the free end of said movable arm, said movable arm having a recess near its end into which said engaging arm moves as the closing lever is turned about its pivot, said parts being so proportioned that the connecting link passes slightly beyond the point of engagement between the engaging arm and the recess as the closing link moves to closed position, said handle being pivoted to the closing lever and having a free arm positioned to engage the movable link when the parts are in closed hook position and the handle is swung outwardly, whereby the connecting link is forced back beyond the said point of engagement.

3. A pelican hook comprising a main link having at one end a chain receiving portion, a pivoted arm pivoted to the other end of said link, said arm having a chain receiving portion, a closing lever, a connecting link pivoted at one end to said main link and at the other end to said closing lever, said closing lever having a handle and an engaging arm for engaging the free end of said movable arm, said movable arm having a recess near its end into which said engaging arm moves as the closing lever is turned about its pivot, a catch for retaining said closing lever in closed hook position, said handle being pivoted to the closing lever and having a free arm so positioned that it will engage the movable arm to release said catch when the handle is raised.

4. A pelican hook comprising a main link, a movable arm pivoted at one end thereof, having a recess in its free end, a closing lever, a link pivoted to said main link and to said closing lever, said closing lever comprising two side plates connected by a web forming a pocket between them in position to receive the end of said movable arm, said movable arm carrying two projecting points defining an upper recess between them and a lower recess below the lowermost point, said web having a hole through which said upper point may project to hold the movable arm against opening when the closing lever is in raised position, and said web being constructed and arranged to form a point positioned to bear against the lowermost point of the movable arm and to pass into the recess beneath said point as said closing lever is rotated.

5. A pelican hook comprising a main link having at one end means of attachment to a chain or the like, and having at the other end a pivoted L-shaped arm, a closing lever positioned to engage said arm when the pivoted end of the arm adjacent to the pivot is inclined downwardly from the pivot, said closing lever having a handle and being constructed and arranged to force said arm to closed position with the pivot end of the arm adjacent to the pivot inclined downwardly toward the pivot, whereby a chain or the like placed on said L-shaped arm first rests on said arm at a point remote from the pivot, and whereby the lever can exert a leverage to tighten up the chain, and when in closed position the chain will rest close to the pivot substantially to free the lever from bending strains, and said pivot having a lost motion and said levers and arm being so proportioned that as said movable arm is brought to closed position, it is raised above its pivot to increase the tension.

6. A pelican hook comprising, in combination, a main link, a curved link pivoted to the main link, having its upper end adapted to extend between the sides of said main link, and having a lug thereon, a retaining link pivoted to said main link, a toggle link pivoted to said retaining link, and being constructed to engage said lug at a point between the pivots of said retaining link when the retaining link extends substantially in the direction of the upper portion of said curved link, whereby said retaining link and said toggle link serve as a toggle to close the curved link and hold it closed.

7. A pelican hook comprising a main link having at one end a chain receiving portion, a movable arm pivoted to the other end of said link, said arm having a chain receiving portion, a closing lever, a connecting link pivoted at one end to said main link and at the other end to said closing lever, said closing lever having a handle and an engaging arm for engaging the free end of said movable arm, said movable arm having a recess near its end into which said engaging arm moves as the closing lever is turned about its pivot, said parts being so proportioned that the point of engagement between the said recess and said engaging arm is brought substantially into alignment between the point of engagement of the chain with the movable arm and the pivot of the chain receiving member as the closing lever is moved to closed position.

WILLIAM ROBERT MacCLUNEY.

REFERENCES CITED

The following references are of record in the file of this patent:

UNITED STATES PATENTS

| Number | Name | Date |
| --- | --- | --- |
| 992,746 | Ashdown | May 23, 1911 |
| 837,948 | McIntosh | Dec. 11, 1906 |
| 2,313,802 | Carlsen | Mar. 16, 1943 |
| 2,328,341 | Higgins | Aug. 31, 1941 |
| 1,849,816 | Yingling | Mar. 15, 1932 |

FOREIGN PATENTS

| Number | Country | Date |
| --- | --- | --- |
| 326,212 | France | May 19, 1903 |